United States Patent [19]

Gardner

[11] Patent Number: 5,228,224
[45] Date of Patent: Jul. 20, 1993

[54] STAND-ALONE EAR TAG

[76] Inventor: Michael S. Gardner, P.O. Box 87006 Meadowbank, Auckland 5, New Zealand

[21] Appl. No.: 700,070

[22] Filed: May 3, 1991

Related U.S. Application Data

[63] Continuation of Ser. No. 409,808, Sep. 20, 1989, abandoned.

[30] Foreign Application Priority Data

Sep. 21, 1988 [NZ] New Zealand .................. 226296
Mar. 22, 1989 [NZ] New Zealand .................. 228456

[51] Int. Cl.5 ............................................. G09F 3/14
[52] U.S. Cl. ................................................. 40/301
[58] Field of Search ............... 40/301; D30/155; 606/116, 117, 215, 216

[56] References Cited

U.S. PATENT DOCUMENTS

| | | | |
|---|---|---|---|
| 3,731,414 | 5/1973 | Murphy et al. | 40/301 |
| 4,021,952 | 5/1977 | Bierley | 40/301 |
| 4,250,643 | 2/1981 | Mackenzie | 40/301 |
| 4,281,657 | 8/1981 | Ritchey | 128/330 |
| 4,451,999 | 6/1984 | Yvorra | 40/301 |

FOREIGN PATENT DOCUMENTS

| | | |
|---|---|---|
| 51372 | 10/1985 | European Pat. Off. . |
| 2285068 | 12/1981 | France . |
| 1372769 | 11/1974 | United Kingdom . |
| 2002696 | 2/1979 | United Kingdom . |
| 2125343 | 3/1984 | United Kingdom . |

Primary Examiner—James R. Brittain
Assistant Examiner—J. Bonifanti
Attorney, Agent, or Firm—Ladas & Parry

[57] ABSTRACT

A stand-alone ear tag is provided; with a main body portion, a neck portion and a head portion integrally connected to the distal end of the neck portion, the head portion having cutting means for piercing an animals ear and the neck portion having a bore or cavity being adapted to receive a driving means wherein the bore or cavity is arranged so as to shield the driving means from contact with the animal during the application.

6 Claims, 3 Drawing Sheets

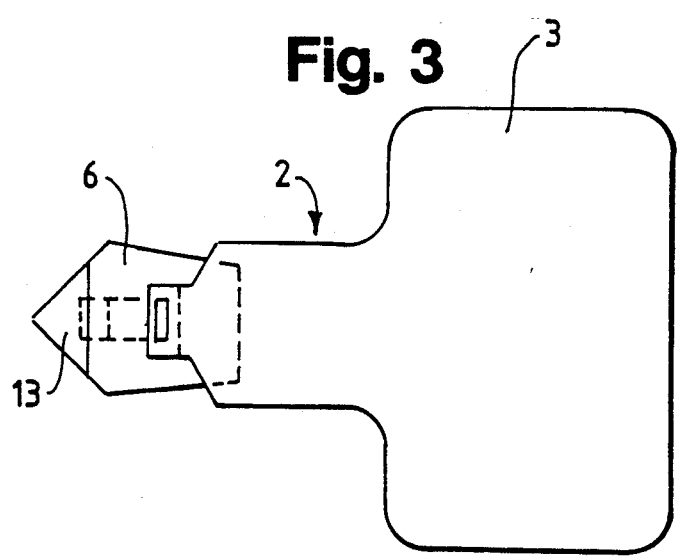
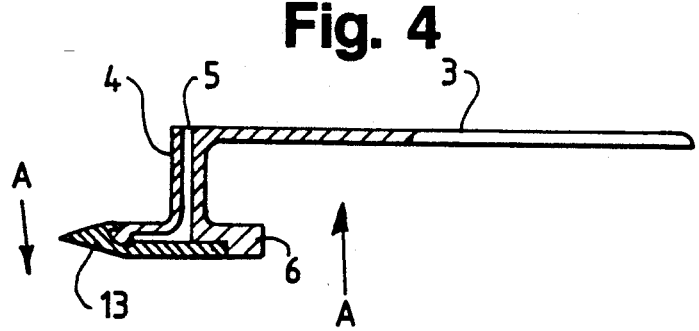

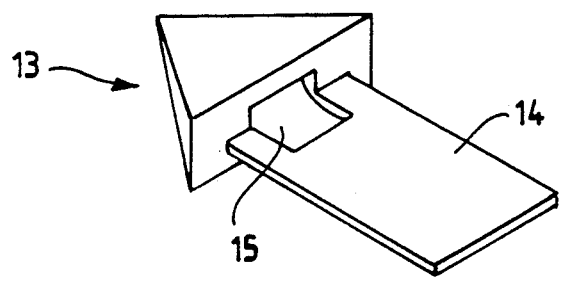
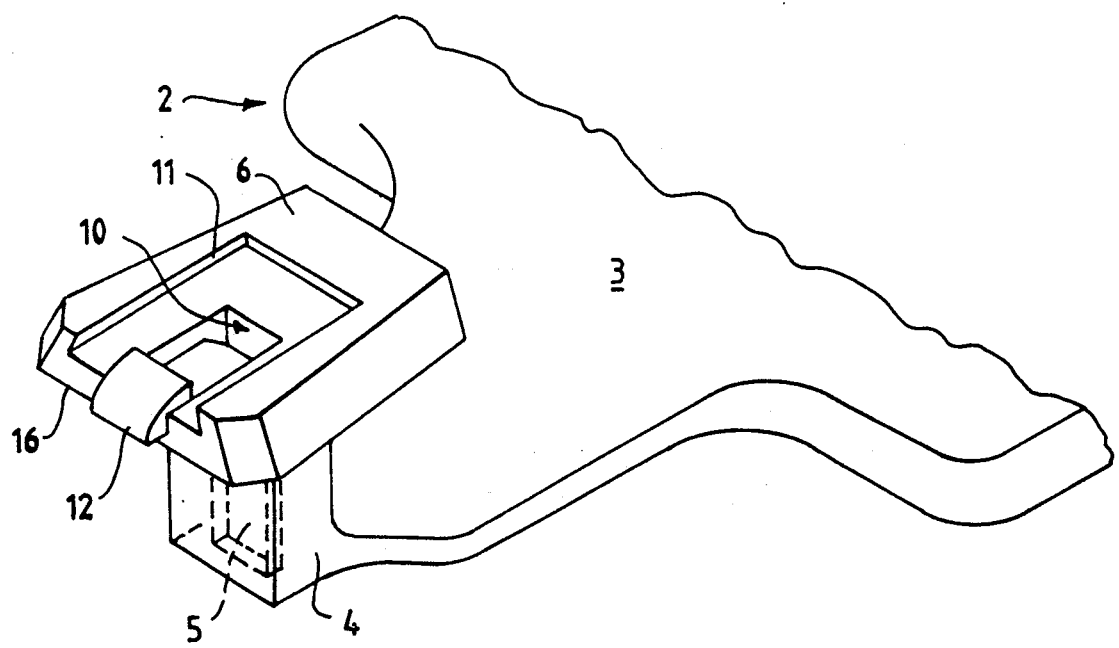

STAND-ALONE EAR TAG

This application is a continuation of application Ser. No. 07/409,808, filed Sep. 20, 1989, now abandoned.

BACKGROUND TO THE INVENTION

This invention relates to a stand-alone ear tag for livestock, and to a method of applying the same.

Many types of ear tags for livestock and the like are available. Ear tags are generally applied to the ear or other portion of an animal by means of a suitable applicator. Generally the applicator includes a pin, blade or other means which is used to pierce the ear of the animal. Some attempt can be made to disinfect the pin, blade or other means, between application of tags on different animals. However, such attempts are not always successful and may lead to cross-infection from one animal to another. In addition, the pin or blade used to pierce the ear or other portion often makes a wound which is larger than might otherwise be the case, and this can cause unnecessary or increased discomfort to the animal. Thus, problems have previously been encountered with infection and other damage to the ear or other portion of the animal during application of an ear tag.

It is an object therefore of the present invention to provide an ear tag for livestock, and a method of applying the same, which goes some way toward overcoming or minimizing the abovementioned problems, or which at least provides the public with a useful alternative. For purposes of clarity "stand-alone" as in stand-alone ear tag is defined as an ear tag which has no separate anchoring means whether integrally formed with the tag or otherwise.

Further objects of the invention will become apparent from the following description.

BRIEF SUMMARY OF THE PRESENT INVENTION

According to one aspect of the present invention there is provided a stand-alone ear tag including at least one main body portion, a neck portion extending outwardly therefrom, with a head portion adjacent its distal end; said head portion having an integral or releasably engageable cutting means for piercing an animals' ear or skin said neck or head portion engageable with a driving means, wherein the ear tag is applied to an animal by piercing the animal's ear or skin wherein the driving means is shielded by the said tag from contact with the animal during application.

According to a further aspect of the present invention there is provided a method of applying a stand-alone ear tag to an animal, including the steps of:
a) engaging a driving means of an ear tag applicator with the neck or head portion of an ear tag;
b) positioning said driving means and said tag adjacent an ear or skin of an animal;
c) actuating said driving means such that a cutting means of said head portion pierces said ear or skin and driving said head portion and at least a portion of said neck therethrough; and
d) thereafter removing said driving means, with said ear tag located adjacent said ear or skin of said animal; wherein the said driving means is shielded by the said tag from contact with the animal during application.

BRIEF DESCRIPTION OF THE DRAWINGS

Further aspects of the present invention will become apparent from the following description, which is given by way of example only, and with reference to the accompanying drawings in which:

FIG. 3: shows a plan view of an ear tag according to a further aspect of the present invention;

FIG. 4: shows a cross-sectional view of an ear tag according to FIG. 3 of the present invention;

FIG. 5: shows a partial perspective view of an ear tag according to the FIG. 3 embodiment; and FIG. 6: shows a perspective view of a cutting tip according to the FIG. 3 embodiment.

DETAILED DESCRIPTION OF THE PREFERRED EMBODIMENTS OF THE PRESENT INVENTION

Figure 1:
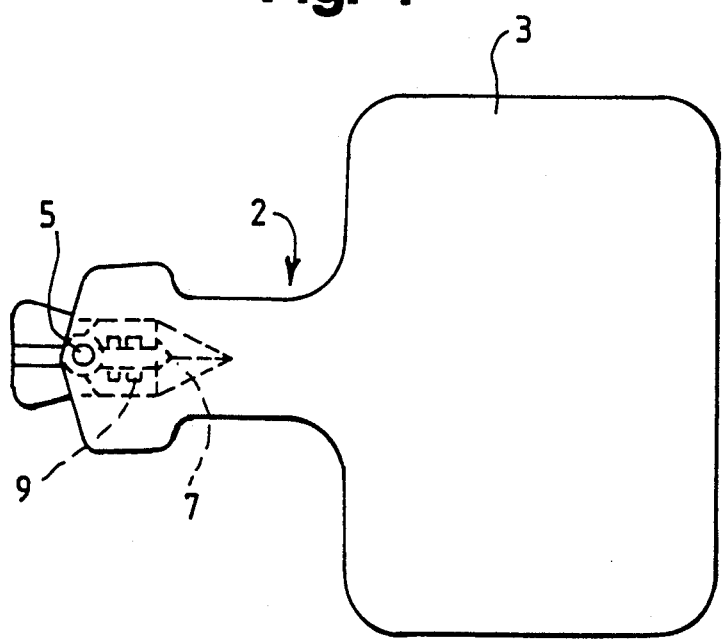
FIG. 1: shows a plan view of an ear tag according to one aspect of the present invention.
Figure 2:
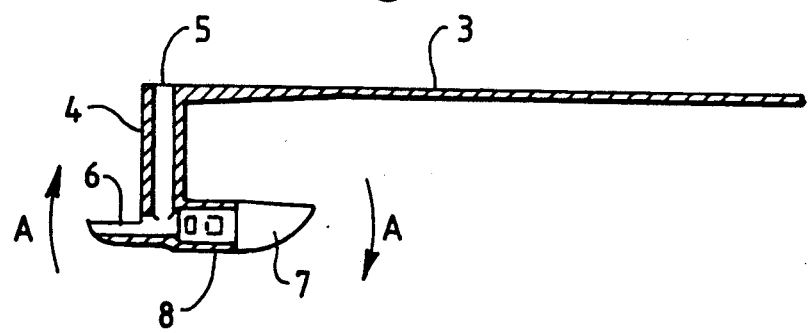
FIG. 2: shows a cross-sectional view of an ear tag according to the same aspect of the present invention.

Referring now to FIGS. 1 and 2 of the accompanying drawings, there is provided by the present invention an ear tag 2. The ear tag 2 includes a main body portion 3, with a neck portion 4 extending outwardly therefrom. The neck portion 4 includes a substantially hollow bore 5 extending therethrough. This neck and bore may be annular, square or rectangular in cross-section depending on the type of applicator driving means used during application.

At the distal end of the neck 4 is provided a head portion 6. The bore 5 extends into the head portion. The head may be narrower or broader than represented in the drawings and it may be hollow or solid.

There is provided a cutting means or tip 7. The cutting tip 7 is preferably formed of a hard or rigid material, such as for example acetal. However, it would be appreciated that other suitable materials may also be used.

The cutting tip 7 may include a body 8. The cutting tip 7 is preferably of a triangular or pointed shape, so as to provide for a sharp piercing or cutting surface, as will be further described hereinafter. The body 8 is preferably substantially flat and angled towards cutting tip 7 so as not to impede piercing of an animal's ear or skin and, once inserted into an animal's ear, so as to lie in substantially the same plane as the said ear.

Referring now to FIG. 2 of the accompanying drawings, in use, a driving means of an ear tag applicator (not shown) is inserted into the bore 5. It will be appreciated that this driving means may comprise an elongate pin or like means, depending on the shape and dimension of the bore 5. Upon insertion of the driving means into the bore 5, the head 6 of the ear tag 2, along with the cutting tip 7, are moved in the directions indicated by the arrows A as shown in FIG. 2, until the head 6 and the cutting tip 7 lie substantially in the plane of the bore 5, (i.e. substantially perpendicular to the original position shown in FIG. 2).

The applicator, attached ear tag 2 and head 6 are then located in a position adjacent an animal ear or other portion to which the tag is to be applied. Once the applicator and tag have been placed in the correct position, the driving means of the applicator is actuated, with the cutting tip 7 being forced through the ear or other portion of the animal by means of the forward movement of the driving means. As mentioned above, the cutting tip 7 may be formed of a substantially rigid material, so as to facilitate the piercing of the ear or skin. The cutting tip 7 is envisaged to be in the nature of a knife type edge which cuts rather than a needle or bayonet type point which forces a path through the ear or skin. To facilitate this the tip is tapered toward its point with cutting edges on its side. The body 8 is shown to be integrally formed or joined with the head portion 6 and, as shown in FIG. 1, it has ribs 9 adapted to strengthen the said forming or joining and to ensure that the body 8 and head portion 6 do not separate during the piercing of an animal's ear.

Once the ear or skin has been pierced, the cutting tip 7 and the remainder of the head portion 6 are driven through the ear or skin. In addition, a portion of the neck 4 will extend through the ear or skin.

Referring now to FIGS. 3 and 4 of the accompanying drawings, there is provided an ear tag 2 having a removable cutting tip. The ear tag 2 includes a main body portion 3, with a neck portion 4 extending outwardly therefrom. The neck portion 4 includes a substantially hollow bore 5 extending therethrough.

As shown in FIG. 5 at the distal end of the neck 4 is provided a head portion 6. The bore 5 extends into the head portion 6 and provides an opening 10 therein. The head portion 6 includes engagement means in the form of a recess 11. The recess 11 is provided with a protrusion 12 at the outer end thereof. In use, the body portion 14 of the cutting tip 13 engages within the recess 11 of the head 6. The head protrusion 12 engages with the recess 15 of the cutting tip 13, so as to engage the cutting tip 13 and the head 6 one with the other. The head 6 is shown to have a leading edge 16. However, this edge is not adapted to provide a sharp cutting edge, hence the need for the insertion of the cutting tip 13. It should be appreciated, that such engagement is not permanent, and thus the cutting tip 13 and head 6 of ear tag 2 may be released from engagement.

As will be seen from FIG. 3, the cutting tip 13 engages with the ear tag 2, so as to provide a head 6, which has a substantially sharp or pointed end thereto.

Referring now to FIG. 4 of the accompanying drawings, the engagement of the cutting tip 13 with the ear tag 2 provides for the bore 5 to be closed at one end, thus forming a cavity. In use, a driving means such as a pin of an ear tag applicator is inserted into the bore 5. A suitable or appropriate applicator would be one such as disclosed and claimed in New Zealand Patent Specification No. 204234, or in New Zealand Patent Specification No. 216968.

Upon insertion of the driving means into the bore 5, the head 6 of the ear tag 2, along with the cutting tip 13, are moved in the directions indicated by the arrows A as shown in FIG. 4, until the head 6 and the cutting tip 13 are substantially in the plain of the bore 5, (i.e. substantially perpendicular to the original position shown in FIG. 4).

The applicator, and attached ear tag 2 and tip 13 are then located in a position adjacent an animal ear or other portion, to which the tag is to be applied. Once the applicator and tag have been placed in the correct position, the applicator is actuated, with the cutting tip 13 being forced through the ear or other portion of the animal.

Once the ear or skin has been pierced, the cutting tip 13 and the remainder of the head portion 6 are driven through the ear or skin. In addition, a portion of the neck 4 will extend through the ear or skin.

After application in the above manner, the driving means of the applicator is withdrawn. This may require the applicator to be pulled away from the ear. In this way, an ear tag may be applied to an ear or other portion of an animal, without the need for the applicator driving means itself to pierce the ear or other portion. This has a number of advantages insofar as hygiene is concerned. With previously available stand-alone tag applicators, the knife or pin of the applicator actually pierced the ear or other portion, and thereafter carried the head of an ear tag through the wound so formed. It will be appreciated that this can lead to cross-infection and the like, even if disinfecting methods are employed. With the tag and method of the present invention, however, the tag alone pierces and touches the ear, or the wound, thus reducing the risk of cross-infection and the like.

Once the tag has been applied, the tag 2 will remain in place about the animals' ear or other portion of the animals body, as it will be retained by the head 6.

In the case of the second embodiment, once the tag has been applied, the cutting tip 13 may be removed, or it may fall off. However, the tag 2 itself will remain in place about the animals' ear or other portion of the animals' body, as it will be retained by the head 6.

As mentioned above, the cutting tips 7 and 13 may be formed of a suitable rigid material. On the other hand, it is preferably that the ear tag 2 be formed of a less rigid material. In one preferred form, the ear tag 2 may be formed of urethane. However, any suitable or appropriate material may be used.

The cutting tip and tag of the present invention may be formed by any suitable or appropriate technique. For example, a suitable moulding or extrusion process may be used. In particular, it is envisaged that in the first embodiment the cutting tip 7 and tag 2 may be integrally formed or moulded.

It is envisaged that variations and modifications may be made to the invention, without departing from the scope thereof. For example, the body portion 3 of the tag may be of any suitable or appropriate shape. Similarly, the shape and configuration of the head portion 6 may be varied, without departing from the scope of the invention. Finally, a separate tag or panel member may be located between the body and head portions and be secured by the neck portion of the car tag. Such member may serve as an additional identification means, contain an insecticide or an electronic disc or finally render the ear tag tamper proof.

I claim:

1. A stand-alone ear tag comprising a main body portion, a neck portion integral with said main body portion and extending outwardly therefrom, and a head portion integrally connected to the neck portion at the distal end of the neck portion, said head portion having cutting means for piercing an animal's ear, said neck portion having a bore or cavity adapted to receive a driving means for applying the ear tag to the animal's ear, said bore or cavity being arranged to shield the driving means so as not to expose it to the animal's blood when applying the tag, said neck portion having a longitudinal axis, and said head portion having a longitudinal axis generally tranverse to the longitudinal axis of said neck portion.

2. A stand alone ear tag according to claim 1, wherein said cutting means has a maximum cross-sectional dimension and said head has a dimension which lies along said longitudinal axis thereof, said one dimension being greater than the cross-sectional dimension of said cutting means.

3. A stand-alone ear tag according to claim 1 wherein the cutting means is integrally formed with the head portion.

4. A stand-alone ear tag according to claim 1 wherein the cutting means is releasably engagable with the head portion.

5. A stand-alone ear tag according to claim 4, wherein the cutting means is engaged with the head portion prior to the application of the ear tag so as to close off said cavity or bore.

6. A stand-alone ear tag according to claim 1, wherein the neck and head portions are positioned substantially perpendicular one to the other prior to and after the application of the ear tag and wherein said head portion includes an extension of said bore or cavity in said neck portion and is bendable relative to said neck portion whereby during the application of the ear tag the head portion is bent by insertion of the driving means so as to provide a uni-directional bore or cavity for the driving means.

* * * * *